Dec. 11, 1956 S. E. PARKER 2,774,069

TRANSMITTER MULTIPLEXING SYSTEM

Filed April 30, 1952 2 Sheets-Sheet 1

INVENTOR.
Sam E. Parker.
BY
ATTORNEYS.

TRANSMITTER MULTIPLEXING SYSTEM

Filed April 30, 1952 2 Sheets-Sheet 2

INVENTOR.
Sam E. Parker.
BY D. E. Snyder
A R McCrady
ATTORNEYS.

2,774,069
Patented Dec. 11, 1956

2,774,069

TRANSMITTER MULTIPLEXING SYSTEM

Sam E. Parker, San Diego, Calif.

Application April 30, 1952, Serial No. 285,297

5 Claims. (Cl. 343—858)

(Granted under Title 35, U. S. Code (1952), sec. 266)

The invention described herein may be manufactured and used by or for the Government of the United States of America for governmental purposes without the payment of any royalties thereon or therefor.

This invention relates to a multiplex system of the type wherein two or more radio frequency transmitters are operated, through a bridged-T network, with a single radiating element.

When two or more radio frequency transmitter circuits in one area operate simultaneously, it is important that there be no intercoupling or cross modulation to cause poor directivity, inefficiency, or operating difficulties. It is common practice to have an antenna for each transmitter, but in certain applications, aboard ship for example, the number of antennas that can be added is limited by severly restricted space as well as by expense. A multiplex system effects a saving in space and money and avoids the distortion of field pattern and modulation which often occurs when two transmitting antennas are operated relatively close to each other in space and in frequency.

In the instant invention, bridged-T or equivalent lattice linear networks intercouple two or more transmitters with a common load. At the power levels involved in multiple transmission, linear networks are inherently simpler and less likely to introduce operational and performance difficulties than active networks such as vacuum-tube couplers. The networks provide complete isolation between component transmitters, allow efficient transmission, are capable of perfect rejection of a single frequency even though dissipation is present in the components, provide perfect rejection regardless of the terminating impedances including load impedance and transmitter output impedance, and permit convenient control of the rejection frequency. Although such networks also offer such desirable features as simplicity and the capability of physical realization, the characteristics listed above distinguish them from conventional filters, resonant and anti-resonant traps, and various coupled circuits, all of which have been proposed for use in multiplexing transmitters. The networks permit normal operation of the transmitters with which they are associated.

An object of the invention is to provide an improved apparatus wherein bridged-T intercoupling is utilized for multiplexing radio frequency circuits.

Other objects and many of the attendant advantages of the invention will be readily appreciated as the same becomes better understood by reference to the following description.

Figure 1:
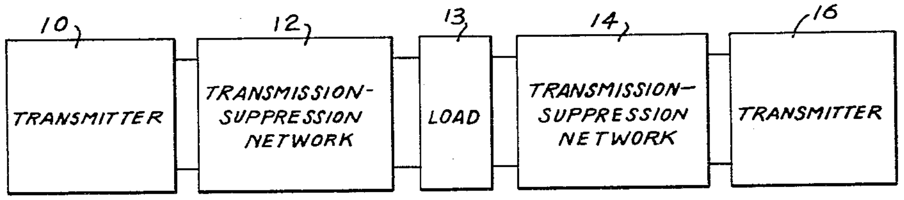
Fig. 1 is a block diagram of a transmitter diplexing system.

Fig. 1 shows a diplexing system in block form in which block 10 represents a transmitter, block 12 represents a lowpass transmission suppression network, block 13 represents the load which is ordinarily an antenna, block 14 represents a highpass transmission suppression network, and block 16 represents a second transmitter operating at a frequency higher than that of the transmitter of block 10. The use of parallel feed as shown is advantageous because it permits formulation of systems which are either unbalanced or balanced. Network 12 rejects all signals produced by transmitter 16 and passes all signals from transmitter 10. Network 14 rejects all signals from transmitter 10 and allows normal operation of transmitter 16.

Figure 2:
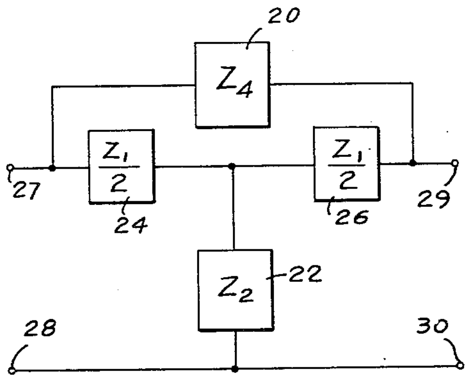
Fig. 2 is a block diagram of a bridged-T network which constitutes an element of the invention.

Fig. 2 shows the basic bridged-T network. The bridge is made up of an impedance represented by block 20 while blocks 22, 24, and 26 form the T portion of the network. Conventional filter notation is used throughout. A transmitter is connected to the network at terminals 27 and 28, and the antenna is connected to terminals 29 and 30.

Figure 3:
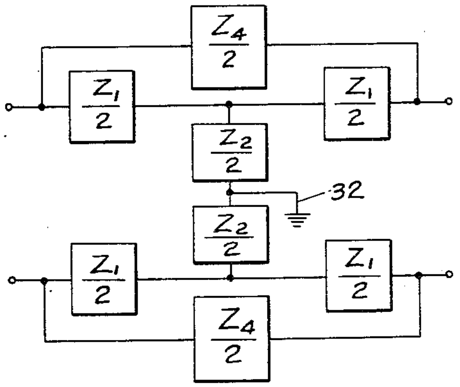
Fig. 3 is a diagram showing a modified form of the device shown in Fig. 2.

Fig. 3 shows a balanced network which is generally equivalent to the form shown in Fig. 2. The balanced form is suitable for use with rhombic or other balanced antennas, and it is made up of two basic bridged-T networks with a central connection to ground at point 32. The denominator in each impedance representation indicates the relation of each block in the balanced arrangement to the corresponding block in the basic network shown in Fig. 2.

Figure 4:
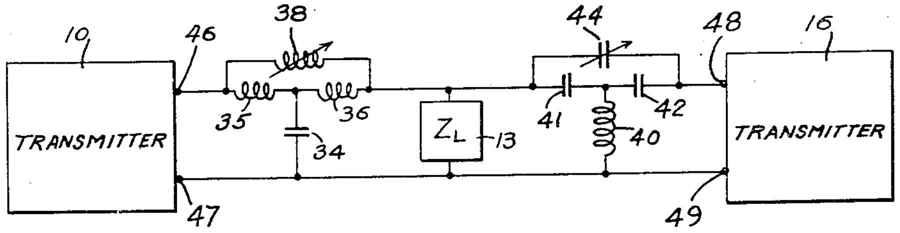
Fig. 4 is a schematic view of a circuit embodying the invention.

In the form of the invention shown in Fig. 4, a specific diplex circuit is represented schematically. A lowpass network is connected between the transmitter 10 operating at the lower frequency and the antenna load 13. A highpass network is connected between the higher frequency transmitter and the load. In the lowpass network, a fixed capacitor 34 forms the leg of the T, and the fixed inductors 35 and 36 make up the two series arms. A variable inductor 38 bridges the T. The highpass network has a fixed inductor 40 as the T leg and fixed capacitors 41 and 42 as the two series arms. A variable capacitor 44 forms the bridge. In the following analysis, the capacitors 34, 41, 42, and 44 are designated as $C_2$, $C_1/2$, $C_1/2$, and $C_4$ respectively. The inductors 35, 36, 38, and 40 are designated as $L_1/2$, $L_1/2$, $L_4$, and $L_2$ respectively.

The conditions for perfect suppression of the networks shown in Fig. 4 are obtained by equating to zero the transfer impedances of the T-section and its bridging circuit. In the general case applicable to the general form of such networks wherein impedances 24 and 26 of Fig. 2 are designated $Z_1$ and $Z_3$ respectively, the expression to be satisfied is:

$$Z_1+Z_3+\frac{Z_1Z_3}{Z_2}+Z_4=0$$

which becomes in the symmetrical case applicable to the symmetrical form of the networks as shown in Fig. 2 where the impedance of block 24 of Fig. 2 is the same $$\left(\frac{Z_1}{2}\right)$$

as that of block 26:

$$Z_1\left(1+\frac{Z_1}{4Z_2}\right)+Z_4=0$$

The so-called null conditions are obtained by equating to zero the real and the imaginary parts of these expressions. In the symmetrical case these conditions are $$R_1+R_4+\frac{R_2(R_1^2-X_1^2)+2R_1X_1X_2}{4(R_2^2+X_2^2)}=0$$

and $$X_1+X_4+\frac{-X_2(R_1^2-X_1^2)+2R_1R_2X_1}{4(R_2^2+X_2^2)}=0$$

The expressions are simplified for networks in which $$R_1^2<<X_1^2,\ R_2^2<<X_2^2,\ \text{and}\ 2R_1R_2<<X_1X_2$$

a condition which results when both the series and shunt arms of the T-section consist of high-Q components, one of which is essentially dissipationless (that is, a low-loss capacitor). Approximate expressions for the suppression conditions then become $$R_1\left(1+\frac{X_1}{2X_2}\right)-R_2\left(\frac{X_1}{2X_2}\right)^2+R_4=0$$

and $$X_1\left(1+\frac{X_1}{4X_2}\right)+X_4=0$$

It is obvious that the suppression characteristics may be controlled simply by varying the values of the components of the bridging arms 38 and 44. This property of the networks makes it possible to employ calibrated dials for adjusting the network to transmitters operating at various frequencies. The transmission properties of the network may be determined by methods used in filter design. The mesh equations, i. e. equations of voltages equilibrium, for the implicit expression of the iterative or image impedance $Z_I$ of the symmetrical bridged-T network resolve to $$Z_1=\sqrt{\frac{Z_4}{Z_1+Z_4}}\sqrt{(Z_1Z_2)\left(1+\frac{Z_1}{4Z_2}\right)}$$

It is seen that the effect of the bridging arm is embodied in the first factor thus simplifying the analysis and operation of networks having variable bridging arms. The reactance values of the components employed may be derived mathematically. In the simplest lowpass network the series arms are equal inductances, the bridge is a variable inductance, and the shunt is a fixed capacitor. The highpass network has the same form but three capacitors are used with one inductance. It is assumed that all arms are dissipationless, so the impedance Z of any arm may be replaced by reactance X. Since the ratio $X_1/X_4$ is constant, it may be denoted by the quantity K, and the image impedance may now be expressed in the form $$Z_1=R_0\sqrt{\frac{1}{1+K}}\sqrt{1+\frac{X_1}{4X_2}}$$

where $R_0=\sqrt{X_1X_2}$=load impedance. The nominal termination $R_0^1$ is given by $$R_0^1=R_0M=\sqrt{X_1X_2}\sqrt{\frac{1}{1+K}}$$

where the quantity M is a multiplier having a value between zero and one, and the cutoff frequency $F_c$ is defined by the relation $$1+\frac{X_1}{4X_2}=0$$

These expressions serve in designing the T-sections. At the suppression frequency the expression becomes $$X_4=-X_1\left(1+\frac{X_1}{4X_2}\right)$$

which establishes the bridge arms.

It is convenient to express the foregoing relations in terms of the parameters $R_0$, $F_c$, $F_s$, and F which are load impedance, cutoff frequency, suppression frequency, and the transmitting frequency respectively. By employing the above equations for image impedance, cutoff frequency, and suppression frequency, the image impedance becomes, in the lowpass case, $$Z_I=R_0\sqrt{\left(1-\left(\frac{F_c}{F_s}\right)^2\right)\left(1-\left(\frac{F}{F_c}\right)^2\right)}$$

and in the highpass case, $$Z_I=R_0\sqrt{\left(1-\left(\frac{F_s}{F_c}\right)^2\right)\left(1-\left(\frac{F_c}{F}\right)^2\right)}$$

These expressions clearly show the manner in which the bridging arm affects the image impedance of the T-sections alone, since the multiplier $$M=\sqrt{\frac{1}{1+K}}$$

is completely determined by $F_c$ and $F_s$. This multiplier varies from zero to unity, depending upon the ratio of these frequencies. In designating a system in which F is to be variable, it is necessary to compromise the terminating conditions to some degree, a value of M being arbitrarily selected for the application at hand. In practice, the fact that M is less than unity is advantageous in designating the T-sections. For example, if $M=0.6$, one may employ $$R_0=\sqrt{X_1X_2}=\frac{50}{0.6}=83.3$$

in computing the elements of the T-section to be operated with a conventional 50-ohm load. In RF applications, therefore, the use of a value of M which is less than unity results in values of inductance and capacitance which are generally more practical than those which result from the use of smaller values of $R_0$. For convenient reference, the foregoing relations are summarized in the following table:

| Design parameter | Lowpass network | Highpass network |
|---|---|---|
| Multiplier | $M=\sqrt{1-\left(\frac{F_c}{F_s}\right)^2}$ | $M=\sqrt{1-\left(\frac{F_s}{F_c}\right)^2}$ |
| Termination | $R_0^1=M\sqrt{\frac{L_1}{C_2}}$ | $R_0=M\sqrt{\frac{L_2}{C_1}}$ |
| Cutoff frequency | $F_c=\frac{1}{\pi\sqrt{L_1C_2}}$ | $F_c=\frac{1}{4\pi\sqrt{L_2C_1}}$ |
| Bridging arm | $L_4=L_1\left[\left(\frac{F_s}{F_c}\right)^2-1\right]$ | $C_4=\frac{C_1}{\left(\frac{F_c}{F_s}\right)^2-1}$ |

If high-Q components are not available, suitable designs may be evolved by cut-and-try methods of placing components in the configuration shown by Fig. 4 and plotting transmission data on a graph until optimum values are determined.

In the operation of the networks shown in Fig. 4, transmitter 10 is operated at a frequency lower than the frequency of transmitter 16. It is assumed that both networks are designed to have the same cutoff frequency $F_c$ between transmitter operating frequencies and to be terminated in the same load resistance. An RF ammeter is shorted across the terminals 46 and 47 of transmitter 10. Power is then supplied to transmitter 16 and the inductance 38 in the lowpass bridge is adjusted for zero transmission across the network which is evidenced by zero current in the meter. The ammeter is then shunted across terminals 48 and 49 of transmitter 16 and power supplied to transmitter 10. The capacitor 44 in the highpass bridge is adjusted for zero transmission. The shunting meter is then removed and each transmitter is tuned and loaded to rated power output using its conventional plate-tank and antenna circuit in the normal manner. Due to the perfect rejection of each network, the process of tuning and loading each transmitter is independent of the adjustment of the other.

Figure 5:
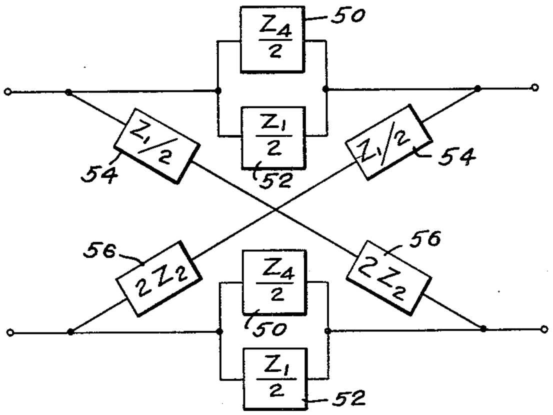
Fig. 5 is a diagram showing a further modified form of the device shown in Fig. 2.

Fig. 5 shows in block form a lattice network derived from a bridged-T network by the use of A. C. Bartlett's "bisection theorem" which is well known to workers in the art. After a form of bridged-T networks suitable for unbalanced systems has been determined, it is always possible to obtain a balanced network as in Fig. 3, and the bridged-T network can always be put in the form of an equivalent lattice. The converse operations are not necessarily possible. The series arms of the lattice consist of blocks 50 and 52. Since the impedances represented denote similar elements in the basic networks, they may be combined in the lattice, with a saving of two circuit components. Because of the fact that the bridging impedance of blocks 54 and 56 influences only the series arms of the lattice, these elements may consist of single, variable components which may be ganged to provide convenient control of the suppression characteristics.

Figure 6:
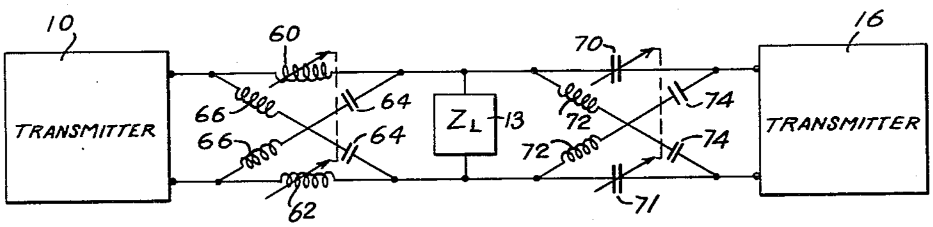
Fig. 6 is a diagram showing a modified form of circuit embodying the invention.

In Fig. 6, two balanced lattice network circuits are shown in relation to the elements with which they are used. The lowpass network comprises two parallel, ganged, variable inductors 60 and 62 with two cross arms each having a fixed capacitor 64 in series with a fixed inductor 66. The output of the higher frequency transmitter 16 goes to a highpass network which passes the output of transmitter 16 but will reject the output of transmitter 10. The highpass network comprises two ganged, variable capacitors 70 and 71 in parallel with two crossing arms each having an inductor 72 in series with a fixed capacitor 74. The lattice component characteristics may be determined by an analysis of the corresponding bridged-T network. The lattice is adjusted with an RF ammeter just as the network shown in Fig. 4 is adjusted.

Figure 7:
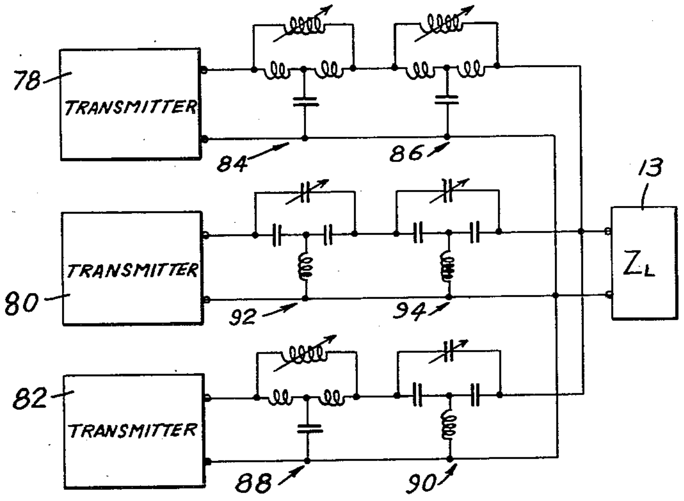
Fig. 7 is a diagram showing another modified form.

Fig. 7 shows a triplexing system in which three transmitters 78, 80, and 82 are connected to a common radiator 13. Each transmitter has two networks to reject all signals from the other two transmitters. Transmitter 78 has two lowpass networks 84 and 86, one of which rejects perfectly all signals from transmitter 80 and one to reject all signals from transmitter 82. Transmitter 80 has two highpass networks 92 and 94, one of which rejects perfectly all signals from the transmitter 78 and one to reject all signals from transmitter 82. Transmitter 82 has one highpass network 90 and one lowpass network 88 to reject the low and high frequencies produced respective by transmitter 78 and 80.

Figure 8:
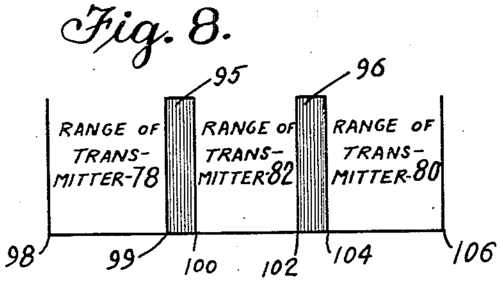
Fig. 8 illustrates the operation of the form shown in Fig. 7.

In Fig. 8, the frequencies of operation of the system shown in Fig. 7 are shown as separated by the shaded bands 95 and 96 which represent the cut-off frequencies of the associated networks. Operation within this band is precluded by the networks because, at frequencies approaching cutoff, both the efficiency of transmission and the effectiveness of suppression become poor. The operating range of transmitter 78 is between points 98 and 99, the range of transmitter 80 is between points 104 and 106, and the range of transmitter 82 is between points 100 and 102.

Each network is adjusted by the procedure given in the discussion of Fig. 4 to provide perfect rejection of the frequency which it is to isolate, and the three transmitters are then operated in the normal manner.

It is well known that transmitting and receiving antennas and transmission systems are mutually interchangeable. It is therefore believed unnecessary to separately describe and illustrate the converse equivalent of each embodiment. The equipment labled "transmitter" may be understood to be a wave receiving equipment, and more than three circuits may be used with each antenna. The antenna may be replaced by a common transmission line.

Obviously many modifications and variations of the present invention are possible in the light of the above teachings. It is therefore to be understood that within the scope of the appended claims the invention may be practiced otherwise than as specifically described.

What is claimed is:

1. A transmitter multiplexing system, comprising an antenna, a plurality of transmitters operating on different frequencies, and coupling means for coupling all of said transmitters to said antenna including bridged-T networks for each transmitter, each network including a shunt arm, two series arms, and a bridging arm across said series arms, each of said arms having reactive elements, the reactive elements of said series arms and bridging arms having a reactance of sign opposite to the sign of the reactance of said shunt arm, the reactance of the reactive element in said bridging arm being variable, said networks being effective to pass the output of the associated transmitter and reject signals produced by all other transmitters.

2. In a diplex system, an antenna, a first transmitter operating at a given frequency, a second transmitter operating at a relatively higher frequency, coupling means effective to couple said first transmitter to said antenna including a first bridged-T network to pass signals produced by said first transmitter and reject all signals produced by said second transmitter, said first bridged-T network consisting of a capacitive element containing shunt arm, two inductive element containing series arms, and a variable inductive element containing bridging arm across said series arms, and coupling means effective to couple said second transmitter to said antenna including a second bridged-T network to pass signals produced by said second transmitter and reject all signals produced by said first transmitter, said second bridged-T network consisting of an inductive element containing shunt arm, two capacitive element containing series arms, and a variable capacitive element containing bridging arm across said series arms.

3. In a transmission system, a plurality of radio frequency circuits, a common load termination for said circuits, means to couple said circuits to said load, and bridged-T networks interposed in said coupling means effective to isolate each circuit from the output of all other circuits in the system and pass the full output of each circuit to said load, each network consisting of a shunt arm, two series arms, and a bridging arm across said series arms, each of said arms having reactive elements, the reactive elements of said series arms and bridging arms having a reactance of sign opposite to the sign of the reactance of said shunt arm, the reactance of the reactive element in said bridging arm being variable.

4. In an apparatus for transmitting signals of different frequencies simultaneously, a plurality of signal generating means, a common element to radiate the generated signals, and means effective to connect each of said signal generating means to said element including bridged-T networks effective to pass the outputs of said signal generating means to said element while preventing the output of any of said signal generating means from interfering with the operation of any other of said signal generating means, each bridged-T network consisting of a shunt arm, two series arms, and a bridging arm across said series arms, each of said arms having reactive elements, the reactive elements of said series arms and bridging arms having a reactance of sign opposite to the sign of the reactance of said shunt arm, the reactance of the reactive element in said bridging arm being variable.

5. In a transmission system, a plurality of radio frequency circuits operating at different frequencies, a common load termination for said circuits, filter means for transmitting between said load and each circuit the frequencies of the associated circuit and for suppressing the frequencies of at least one other circuit, said filter means comprising a bridged-T network including a pair of series arms having like reactance of predetermined sign, and a shunt arm having a reactance of sign opposite to the reactance of said series arms, said network including adjustable means for controlling the optimum suppression frequencies of said filter means regardless of the terminating impedances thereof, said adjustable means comprising an impedance arm bridging said series arms and having a reactance of said predetermined sign.

(References on following page)

References Cited in the file of this patent

UNITED STATES PATENTS

| | | |
|---|---|---|
| 1,501,667 | Johnson | July 15, 1924 |
| 1,557,230 | Zobel | Oct. 13, 1925 |
| 1,604,981 | Elsasser | Nov. 2, 1926 |
| 1,721,567 | Martin | July 23, 1929 |
| 1,941,305 | Hinton | Dec. 26, 1933 |
| 2,082,096 | Brown | June 1, 1937 |
| 2,177,761 | Wheeler | Oct. 31, 1939 |
| 2,249,415 | Bode | July 15, 1941 |
| 2,278,620 | Meixell | Apr. 7, 1942 |
| 2,308,013 | Lee | Jan. 12, 1943 |
| 2,373,458 | Clark | Apr. 10, 1945 |
| 2,593,361 | Sziklai | Apr. 15, 1952 |

OTHER REFERENCES

"The Electron Art," Electronics Mag., December 1951, page 140.

Radio Engineers' Handbook by F. E. Terman, McGraw-Hill Book Company, 1943 ed., pp. 197–251.